United States Patent [19]

Patel

[11] Patent Number: 5,281,241
[45] Date of Patent: Jan. 25, 1994

[54] POLYCYCLIC DYES

[75] Inventor: Prakash Patel, Edgerton, England

[73] Assignee: Zeneca Limited, London, England

[21] Appl. No.: 986,066

[22] Filed: Dec. 4, 1992

[30] Foreign Application Priority Data

Dec. 11, 1991 [GB] United Kingdom ............... 9126352

[51] Int. Cl.[5] ............... C07D 407/02; C07D 409/10; C09B 49/12
[52] U.S. Cl. ........................ 8/639; 534/843; 534/854; 549/60; 549/299
[58] Field of Search ............ 549/299, 60; 534/843, 534/854; 8/639

[56] References Cited

FOREIGN PATENT DOCUMENTS 0033583 8/1981 European Pat. Off. .
0436940 7/1991 European Pat. Off. .
0492893 7/1992 European Pat. Off. .

Primary Examiner—Alan L. Rotman
Assistant Examiner—Ba K. Trinh
Attorney, Agent, or Firm—Cushman, Darby & Cushman

[57] ABSTRACT

A polycylic dye of the Formula (1):

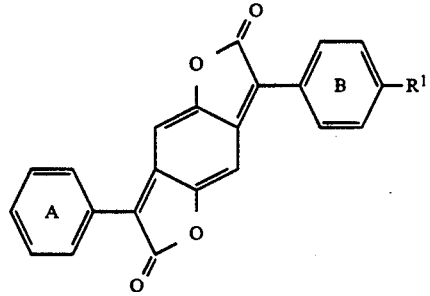

Formula (1)

wherein:
R[1] is —$OSO_2R$ in which R is optionally substituted alkyl, alkoxy, aryl, alkoxyaryl, cycloalkyl or heteroaryl;
Ring A is unsubstituted or is substituted by from one to three groups; and
Ring B is unsubstituted or is substituted by one or two groups in addition to the group R[1].

Dyes of the present invention are useful for the coloration of textile materials particularly synthetic textile materials such as polyester, dye mixtures comprising a polycyclic dye of Formula (1) and a different polycyclic dye or an azo dye show improved build-up on polyester material.

5 Claims, No Drawings

POLYCYCLIC DYES

This invention relates to novel polycylic dyes and to novel mixtures comprising polycyclic dyes.

According to the present invention there is provided a polycylic dye of the Formula (1):

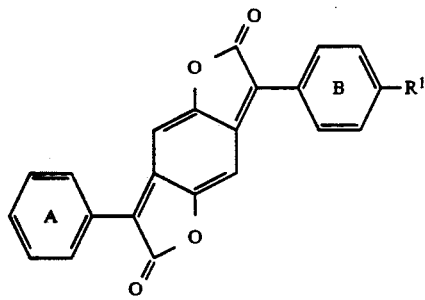

Formula (1)

wherein:
- $R^1$ is —$OSO_2R$ in which R is optionally substituted alkyl, alkoxy, aryl, alkoxyaryl, cycloalkyl or heteroaryl;
- Ring A is unsubstituted or is substituted by from one to three groups; and
- Ring B is unsubstituted or is substituted by one or two groups in addition to the group $R^1$.

The alkyl group represented by R is preferably $C_{1-6}$-alkyl and more preferably $C_{1-4}$-alkyl. The alkoxy group represented by R is preferably $C_{1-6}$-alkoxy and more preferably $C_{1-4}$-alkoxy. The alkoxyaryl group represented by R is preferably $C_{1-6}$-alkoxyphenyl. The aryl group represented by R is preferably phenyl, naphth-2-yl or naphth-1-yl. The cycloalkyl group represented by R is preferably $C_{4-8}$-cycloalkyl, more preferably cyclohexyl. The heteroaryl group represented by R is preferably a 5- or 6-membered heterocyclic group which may be saturated or unsaturated, suitable heteroaryl groups represented by R include pyridyl, pyrrolyl, thienyl, furyl, pyranyl, thiazolyl, pyrazolyl, imidazolyl, thiadiazolyl, piperidyl, pyrrolidyl, tetrahydrothienyl, tetrahydrofuryl, tetrahydropyranyl and morpholinyl. An especially preferred heteroaryl group represented by R is thienyl. Where any of the groups represented by R is substituted the preferred substituents are selected from $C_{1-6}$-alkyl, $C_{1-6}$-alkoxy, phenyl, nitro, halogen, especially —F and —Cl, hydroxy, $C_{1-6}$-alkoxy-$C_{1-6}$-alkoxy, $C_{1-6}$-alkylcarbonyl, $C_{1-6}$-alkoxycarbonyl, $C_{1-6}$-alkoxy-$C_{1-6}$-alkoxycarbonyl, $C_{1-6}$-alkoxycarbonyloxy, $C_{1-6}$-alkoxy-$C_{1-6}$-alkoxycarbonyloxy, $C_{1-6}$-alkylcarbonyloxy, cyano and —$NR^2R^3$ in which $R^2$ and $R^3$ each independently is —H, $C_{1-6}$-alkyl, cyano $C_{1-6}$-alkyl, hydroxy$C_{1-6}$-alkyl or phenyl. Any of the alkyl groups or the alkyl part of any alkoxy group referred to above may be straight or branched chain alkyl.

Where Ring A carries from one to three substituent groups these are preferably independently selected from those substituents defined above for R and $C_{2-4}$-alkenyl, $C_{1-6}$-alkylthio, phenylthio, phenoxy, $C_{1-6}$-alkylsulphonyl, —$NHCOC_{1-6}$-alkyl, —$NHSO_2C_{1-6}$-alkyl, —$CONR^2R^3$, —$SO_2NR^2R^3$ and —$COOR^2$ in which $R^2$ and $R^3$ are as hereinbefore defined. When Ring A carries one substituent this is preferably in the 4-position, when Ring A carries two substituents these are preferably in the 3- and 4-positions and when Ring A carries three substituents these are preferably in the 3-, 4- and 5-positions.

Where Ring B carries one or two substituents in addition to the group $R^1$ these substituents are preferably independently selected from those defined above for Ring A including those substituents defined above for R. When Ring B carries one additional substituent this is preferably in the 3-position, and when Ring B carries two additional substituents these are preferably in the 3- and 5-positions.

According to a further feature of the present invention there is provided a mixture comprising a polycyclic dye of Formula (1) wherein;
- $R^1$, Ring A and Ring B are as hereinbefore defined and a polycyclic dye of Formula (2):

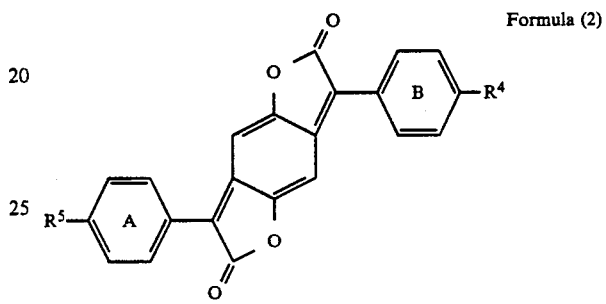

Formula (2)

wherein:
- $R^4$ and $R^5$ each independently is —H, —OH, —R, —$OSO_2R$, —$OCO.R$ in which R is as hereinbefore defined; and
- Ring A and Ring B are as hereinbefore defined.

The mixtures of polycyclic dyes the present invention preferably comprise from 80% to 99.5% of a dye of Formula (1) and from 20% to 0.5% of a polycyclic dye of Formula (2), more preferably from 80% to 95% of a dye of Formula (1) and from 20% to 5% of a polycyclic dye of Formula (2) and especially from 85% to 95% of a dye of Formula (1) and from 15% to 5% of a dye of Formula (2).

According to a further feature of the present invention there is provided a mixture comprising a polycyclic dye of Formula (1) wherein:
- $R^1$, Ring A and Ring B are as hereinbefore defined and an azo dye.

The azo dye is preferably an orange to red azo dye and is more preferably of the Formula (3):

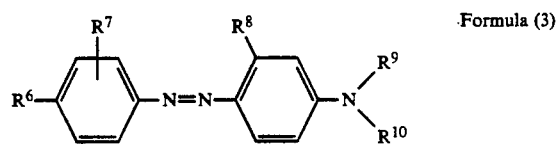

Formula (3)

in which
- $R^6$ is —$NO_2$ or —CN;
- $R^7$ is —H, halogen or —CN;
- $R^8$ is —H, —NHCOalkyl, —$NHSO_2$alkyl or alkyl; and
- $R^9$ and $R^{10}$ each independently is —H, alkyl or substituted alkyl.
- $R^7$ is preferably —H, —Cl, —Br or —CN;
- $R^8$ is preferably —H, —$NHCOC_{1-4}$-alkyl, —$NHSO_2C_{1-4}$-alkyl or $C_{1-4}$-alkyl;

$R^9$ and $R^{10}$ each independently is preferably —H, $C_{1-4}$-alkyl, $C_{1-4}$alkylCOOC$_{1-4}$-alkyl, $C_{1-4}$-alkylOCOC$_{1-4}$-alkyl, $C_{1-4}$-alkylCN or $C_{1-4}$-alkylCl.

An especially preferred dye of Formula (3) is that in which $R^6$ is —NO$_2$, $R^7$ is —H, $R^8$ is —NHCOCH$_3$ and $R^{10}$ are —C$_2$H$_4$COOCH$_3$.

Dyes and mixtures of the present invention may be used for coloration of textile materials such as polyester material. Mixtures of dyes comprising dyes of the present invention surprisingly produce an improvement over individual dyes in build-up of dye on the textile material and in temperature range properties.

The mixtures of polycyclic and azo dyes of the present invention preferably comprise from 80% to 99% of a dye of Formula (1) and from 20% to 1% of a dye of Formula (3) and more preferably from 85% to 95% of a dye of Formula (1) and from 15% to 5% of a dye of Formula (3).

Dyes of Formula (1) and the mixtures of the present invention may be used in mixtures to produce black shades on textile material, particularly on polyester fabric.

The dyes of Formula (1) may be prepared by sulphonylation of the corresponding hydroxy compound (i.e., the compound of Formula (1) in which $R^1$ is —OH and Rings A and B carry no additional substituents) with the appropriate sulphonyl chloride. The hydroxy compound may in turn be prepared for example by the procedure described in European Patent 0033583 and as described herein.

The dyes of Formula (2) may be prepared by the procedures described in United Kingdom Patent 1568231 and in European Patents 0146269 and 0033583.

The invention is further illustrated by the following examples:

COMPOUND A

Preparation of 3-phenyl-7-(4-hydroxyphenyl)-2,6-dioxo-2,6-dihydrobenzo [1:2-b, 4:5-b']difuran A mixture of 5-hydroxy-2-oxo-3-phenyl-2,3-dihydrobenzofuran (0.25 mol), 4-hydroxymandelic acid (0.25 mol), acetic acid (600 cm$^3$), and concentrated sulphuric acid (11 cm$^3$) was stirred and heated under reflux for 16 hours. The mixture was cooled to 90° C. and ammonium persulphate (56 g) was added in small portions over 0.5 hour.

The mixture was refluxed for a further 3 hours before pouring into a mixture of ice and water. The precipitated solid was filtered off, washed with water, slurried with methanol and filtered off again and washed with water before drying to give 3-phenyl-7-(4-hydroxyphenyl)-2,6-dioxo-2,6-dihydrobenzo[1:2-b, 4:5-b']difuran (26%) as a red solid $\lambda_{max}$ in acetone=499 nm.

COMPOUND B

Preparation of 3-phenyl-7-(4-n-propoxyphenyl)-2,6-dioxo-2,6-dihydrobenzo[1:2-b, 4:5-b']difuran The procedure for Compound A was followed except that 4-n-propxymandelic acid was used in place of the 4-hydroxymandelic acid to give 3-phenyl-7-(4-n-propoxyphenyl)-2,6-dioxo-2,6-dihydrobenzo[1:2-b, 4:5-b']difuran $\lambda_{max}$ 504 nm in CH$_2$Cl$_2$.

COMPOUND C

Preparation of 3-phenyl-7-(4-ethylcarbonyloxyphenyl)-2,6-dioxo-2,6-dihydrobenzo[1:2-b, 4:5-b']difuran The procedure for Compound A was followed except that propionyl chlorine was used in place of the sulphonyl chloride to give 3-phenyl-7-(4-ethylcarbonyloxyphenyl)-2,6-dioxo-2,6-dihydrobenzo[1:2-b, 4:5-b']difuran $\lambda_{max}$ 467 nm in CH$_2$Cl$_2$.

COMPOUND D

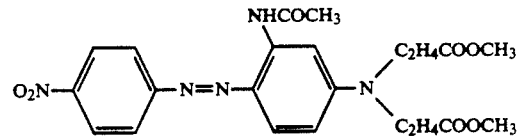

Obtainable from Imperial Chemical Industries PLC.

GENERAL PROCEDURE FOR SULPHONYLATION

A mixture of Compound A (3-phenyl-7-(4-hydroxyphenyl)-2,6-dioxo-2,6-dihydrobenzo[1:2-b, 4:5-b']difuran) (0.028 mol), triethylamine (0.07 mol) and dichloromethane (200 cm$^3$) was stirred and the appropriate sulphonyl chloride, RSO$_2$Cl (0.106 mol) was added dropwise.

The mixture was stirred at room temperature for 14 hours before diluting with methanol (300 cm$^3$) and filtering off the residual solid. The solid was washed with methanol and dried before recrystallising from toluene to give the corresponding sulphonyloxy derivative. The following dyes were prepared using the above method:

| Example | R in sulphonylchloride | $\lambda_{max}$ (CH$_2$Cl$_2$)/nm |
|---|---|---|
| 1 | ethyl | 458 |
| 2 | phenyl | 464 |
| 3 | (4-methylphenyl) | 464 |
| 4 | methyl | 464 |
| 5 | n-propyl | 466 |
| 6 | i-propyl | 466 |
| 7 | (4-methoxyphenyl) | 467 |
| 8 | (4-nitrophenyl) | 460 |
| 9 | thien-2-yl | 465 |
| 10 | cyclohexyl | 466 |

The following mixtures of the present invention were prepared by physically mixing the dyes before dyeing polyester textile material at 130° C. and 140° C.:

| Example | Dye | % | Dye | % | Dyebath Temperature |
|---|---|---|---|---|---|
| 11 | Example 1 | 95 | Compound A | 5 | |
| 12 | Example 1 | 90 | Compound A | 10 | 130° C. |
| 13 | Example 1 | 85 | Compound A | 15 | |
| 14 | Example 1 | 80 | Compound A | 20 | |
| 15 | Example 1 | 90 | Compound A | 10 | |
| 16 | Example 1 | 85 | Compound A | 15 | 140° C. |
| 17 | Example 1 | 80 | Compound A | 20 | |
| 18 | Example 3 | 90 | Compound A | 10 | |
| 19 | Example 3 | 85 | Compound A | 15 | 130° C. |
| 20 | Example 3 | 80 | Compound A | 20 | |
| 21 | Example 3 | 90 | Compound A | 10 | |
| 22 | Example 3 | 85 | Compound A | 15 | 140° C. |
| 23 | Example 3 | 80 | Compound A | 20 | |
| 24 | Example 9 | 85 | Compound A | 15 | 130° C. |

-continued

| Example | Dye | % | Dye | % | Dyebath Temperature |
|---|---|---|---|---|---|
| 25 | Example 9 | 80 | Compound A | 20 | |
| 26 | Example 9 | 90 | Compound A | 10 | |
| 27 | Example 9 | 85 | Compound A | 15 | 140° C. |
| 28 | Example 9 | 80 | Compound A | 20 | |
| 29 | Example 9 | 90 | Compound B | 10 | 130° C. |
| 30 | Example 9 | 90 | Compound B | 10 | 140° C. |
| 31 | Example 9 | 90 | Compound C | 10 | 130° C. |
| 32 | Example 9 | 90 | Compound C | 10 | 140° C. |
| 33 | Example 9 | 90 | Compound D | 10 | 130° C. |
| 34 | Example 9 | 90 | Compound D | 10 | 140° C. |

The performance of these mixtures was evaluated in batchwise dyeing of polyester fabric. The build-up of dye mixtures on polyester fabric was assessed at dyebath temperatures of 130° C. and 140° C. Improved build-up of dye occurs when for the same amount of applied dye a greater proportion of the dye goes onto the fabric to give a greater depth of shade (colour yield). Thus, the higher the build-up of dye on the fabric, the less dye is required the achieve a particular depth of shade and the more economical it is in use. The mixtures of Examples 11 to 17 showed better build-up than the dye of Example 1 alone, the mixtures of Examples 18 to 23 showed better build-up than the dye of Example 3 alone and Examples 24 to 34 showed better build-up than the dye of Example 9 alone.

I claim:

1. A polycyclic dye of the Formula (1):

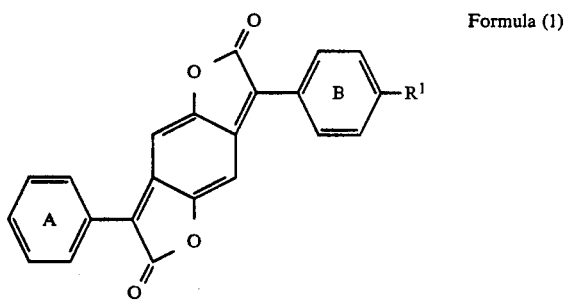

Formula (1)

wherein:

R$^1$ is —OSO$_2$R in which R is optionally substituted alkyl, alkoxy, aryl, alkoxyaryl, cycloalkyl or heteroalkyl, the optional substituents being selected from the group consisting of C$_{1-6}$ alkyl, C$_{1-6}$-alkoxy, phenyl, nitro, halogen, hydroxy, C$_{1-6}$-alkoxyC$_{1-6}$-alkoxy, C$_{1-6}$-alkylcarbonyl, C$_{1-6}$-alkoxycarbonyl, C$_{1-6}$-alkoxy-C$_{1-6}$-alkoxycarbonyl, C$_{1-6}$-alkoxycarbonyloxy, C$_{1-6}$-alkoxyC$_{1-6}$-alkoxycarbonyloxy, C$_{1-6}$-alkylcarbonyloxy, cyano and —NR$^2$R$^3$ in which R$^2$ and R$^3$ each independently is selected from the group consisting of —H, C$_{1-6}$-alkyl, cyano C$_{1-6}$-alkyl, hydroxyC$_{1-6}$-alkyl and phenyl;

Ring A is unsubstituted or is substituted by from one to three groups independently selected from those substituents defined above for R and C$_{2-4}$-alkenyl, C$_{1-6}$-alkylthio, phenylthio, phenoxy, C$_{1-6}$-alkylsulphonyl, —NHCOC$_{1-6}$-alkyl, —NHSO$_2$C$_{1-6}$-alkyl, —CONR$^2$R$^3$, —SO$_2$NR$^2$R$^3$ and —COOR$^2$ in which R$^2$ and R$^3$ are as hereinbefore defined; and Ring B is unsubstituted or is substituted by one or two groups independently selected from those substituents defined above for R and C$_{2-4}$-alkenyl, C$_{1-6}$-alkylthio, phenylthio, phenoxy, C$_{1-6}$-alkylsulphonyl, —NHCOC$_{1-6}$-alkyl, —NHSO$_2$C$_{1-6}$-alkyl, —CONR$^2$R$^3$, —SO$_2$NR$^2$R$^3$ and and —COOR$^2$ in which R$^2$ and R$^3$ are as hereinbefore defined in addition to the group R$^1$.

2. A mixture comprising a polycyclic dye of Formula (1):

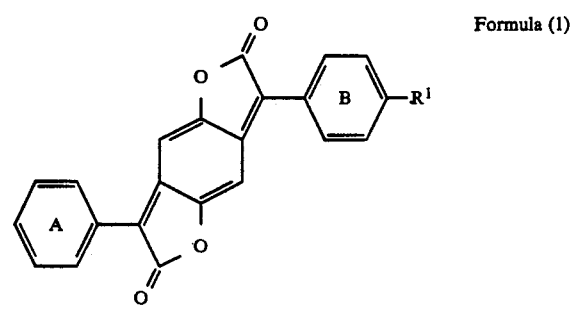

Formula (1)

wherein:

R$^1$ is —OSO$_2$R in which R is optionally substituted alkyl, alkoxy, aryl, alkoxyaryl, cycloalkyl or heteroalkyl, the optional substituents being selected from the group consisting of C$_{1-6}$ alkyl, C$_{1-6}$-alkoxy, phenyl, nitro, halogen, hydroxy, C$_{1-6}$-alkoxyC$_{1-6}$-alkoxy, C$_{1-6}$-alkylcarbonyl, C$_{1-6}$-alkoxycarbonyl, C$_{1-6}$-alkoxy-C$_{1-6}$-alkoxycarbonyl, C$_{1-6}$-alkoxycarbonyloxy, C$_{1-6}$-alkoxyC$_{1-6}$-alkoxycarbonyloxy, C$_{1-6}$-alkylcarbonyloxy, cyano and —NR$^2$R$^3$ in which R$^2$ and R$^3$ each independently is selected from the group consisting of —H, C$_{1-6}$-alkyl, cyano C$_{1-6}$-alkyl, hydroxyC$_{1-6}$-alkyl and phenyl;

Ring A is unsubstituted or is substituted by from one to three groups independently selected from those substituents defined above for R and C$_{2-4}$-alkenyl, C$_{1-6}$-alkylthio, phenylthio, phenoxy, C$_{1-6}$-alkylsulphonyl, —NHCOC$_{1-6}$-alkyl, —NHSO$_2$C$_{1-6}$-alkyl, —CONR$^2$R$^3$, —SO$_2$NR$^2$R$^3$ and —COOR$^2$ in which R$^2$ and R$^3$ are as hereinbefore defined; and Ring B is unsubstituted or is substituted by one or two groups independently selected from those substituents defined above for R and C$_{2-4}$-alkenyl, C$_{1-6}$-alkylthio, phenylthio, phenoxy, C$_{1-6}$-alkylsulphonyl, —NHCOC$_{1-6}$-alkyl, —NHSO$_2$C$_{1-6}$-alkyl, —CONR$^2$R$^3$, —SO$_2$NR$^2$R$^3$ and —COOR$^2$ in which R$^2$ and R$^3$ are as hereinbefore defined in addition to the group R$^1$;

and a polycyclic dye of Formula (2):

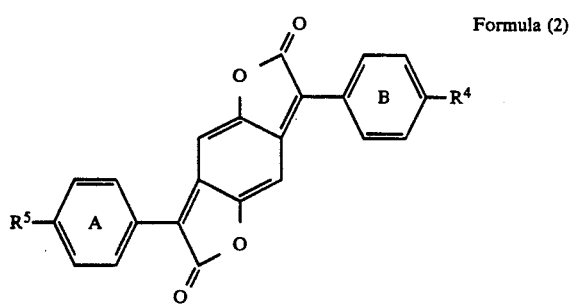

Formula (2)

wherein:

R$^4$ and R$^5$ are each independently —H, —OH, —R, —OSO$_2$R, —OCO.R in which R is as hereinbefore defined; and Ring A and Ring B are as hereinbefore defined.

3. A mixture comprising a polycyclic dye of Formula (1):

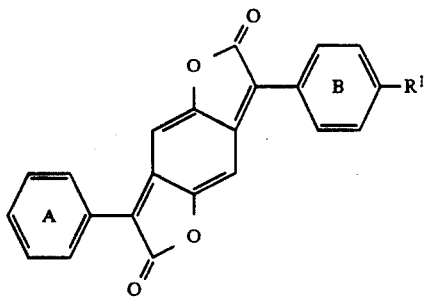

Formula (1)

wherein:

R¹ is —OSO₂R in which R is optionally substituted alkyl, alkoxy, aryl, alkoxyaryl, cycloalkyl or heteroalkyl, the optional substituents being selected from the group consisting of $C_{1-6}$ alkyl, $C_{1-6}$-alkoxy, phenyl, nitro, halogen, hydroxy, $C_{1-6}$-alkoxy$C_{1-6}$-alkoxy, $C_{1-6}$-alkylcarbonyl, $C_{1-6}$-alkoxycarbonyl, $C_{1-6}$-alkoxy-$C_{1-6}$-alkoxycarbonyl, $C_{1-6}$-alkoxycarbonyloxy, $C_{1-6}$-alkoxy$C_{1-6}$-alkoxycarbonyloxy, $C_{1-6}$-alkylcarbonyloxy, cyano and —NR²R³ in which R² and R³ each independently is selected from the group consisting of —H, $C_{1-6}$-alkyl, cyano $C_{1-6}$-alkyl, hydroxy $C_{1-6}$-alkyl and phenyl;

Ring A is unsubstituted or is substituted by from one to three groups independently selected from those substituents defined above for R and $C_{2-4}$-alkenyl, $C_{1-6}$-alkylthio, phenylthio, phenoxy, $C_{1-6}$-alkylsulphonyl, —NHCO$C_{1-6}$-alkyl, —NHSO₂$C_{1-6}$-alkyl, —CONR²R³, —SO₂NR²R³ and —COOR² in which R² and R³ are as hereinbefore defined; and Ring B is unsubstituted or is substituted by one or two groups independently selected from those substituents defined above for R and $C_{2-4}$-alkenyl, $C_{1-6}$-alkylthio, phenylthio, phenoxy, $C_{1-6}$-alkylsulphonyl, —NHCO$C_{1-6}$-alkyl, —NHSO₂$C_{1-6}$-alkyl, —CONR²R³, —SO₂NR²R³ and —COOR² in which R² and R³ are as hereinbefore defined in addition to the group R¹ and an azo dye.

4. A mixture according to claim 3 wherein the azo dye is an orange to red azo dye.

5. A mixture according to claim 3 or claim 4 wherein the azo dye is of the Formula (3):

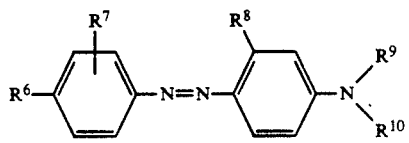

Formula (3)

in which

R⁶ is —NO₂ or —CN;

R⁷ is —H, halogen or —CN;

R⁸ is —H, —NHCOalkyl, —NHSO₂alkyl or alkyl; and

R⁹ and R¹⁰ each independently is selected from —H, alkyl, and alkyl substituted by a group selected from —COOC$_{1-4}$-alkyl, —OCOC$_{1-4}$-alkyl, —CN and —Cl.

* * * * *